United States Patent [19]

Sekiya et al.

[11] 4,167,692
[45] Sep. 11, 1979

[54] BRUSH-LESS DC MOTOR

[75] Inventors: Tetsuo Sekiya; Hiroyuki Uchida, both of Yokohama; Hiroyuki Yamauchi, Urawa; Kenkichi Umeda, Tokyo, all of Japan

[73] Assignee: Sony Corporation, Tokyo, Japan

[21] Appl. No.: 845,435

[22] Filed: Oct. 25, 1977

[30] Foreign Application Priority Data

| Nov. 1, 1976 [JP] | Japan | 51-132136 |
| Dec. 24, 1976 [JP] | Japan | 51-156887 |
| Jan. 21, 1977 [JP] | Japan | 52-6575[U] |
| Feb. 2, 1977 [JP] | Japan | 52-11477[U] |

[51] Int. Cl.² ............................................. H02K 29/00
[52] U.S. Cl. ...................................... 318/138; 310/90; 310/268
[58] Field of Search ................... 318/138, 254, 696; 310/268, 90

[56] References Cited

U.S. PATENT DOCUMENTS 3,993,920  11/1976  Sato ........................... 310/268

Primary Examiner—Gene Z. Rubinson
Attorney, Agent, or Firm—Lewis H. Eslinger; Alvin Sinderbrand

[57] ABSTRACT

A brush-less DC motor includes a stator member; a stationary cylindrical member projected from the stator member and having bearings on its inner circumferential surface; a rotary shaft being rotatably supported by the bearings of the stationary cylindrical member; a rotary cylindrical member into which the stationary cylindrical member is inserted, and to which the rotary shaft is fixed; two rotary discs of magnetic material, fixed to the rotary cylindrical member and spaced from each other; a permanent magnet fixed to one of the rotary discs; a rotational-position detecting member; and a coil assembly including a plurality of coil units. The working point of the rotary shaft is nearer to the stationary cylindrical member than to the rotary cylindrical member.

17 Claims, 39 Drawing Figures

FIG. 29
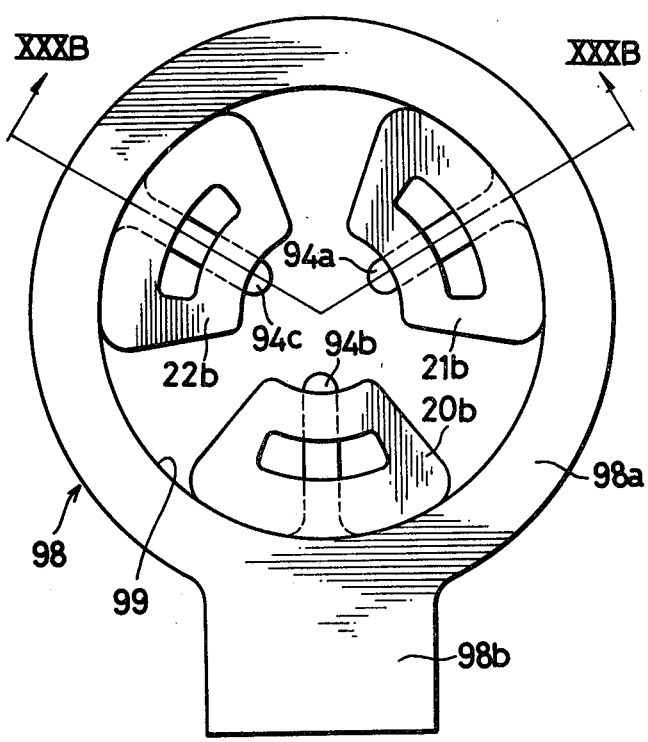
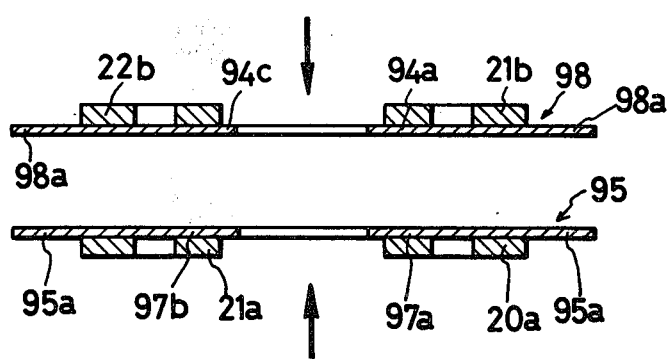

BRUSH-LESS DC MOTOR

BACKGROUND OF THE INVENTION

1. Field of the Invention

This invention relates to a brush-less DC motor, and more particularly to a brush-less DC motor suitable for a tape recorder of the capstan direct drive type.

2. Description of the Prior Art

Generally, a brush-less DC motor is widely used for an acoustic apparatus, such as a tape recorder, since the brush-less DC motor quietly rotates in contrast with a DC motor having brushes. However, most of brush-less DC motors are relatively large in the direction along the rotary shaft. In such a brush-less DC motor, the direction of the magnetic field is perpendicular to the rotary shaft. It is difficult to manufacture a flat brush-less DC motor of such type, since the height of the energized conductor to generate rotational force is reduced.

Recently, a relatively flat brush-less DC motor has been proposed, for example, as disclosed in U.S. Pat. No. 3,912,956, in which a magnetic field parallel with the rotary shaft is applied to the energized radially extending conductor. The magnetic field can be effectively applied to the energized conductor to convert electrical energy to mechanical energy even if such brush-less DC motor has a small thickness in the axial direction. The motor is simple in contruction, and has a long life-time. Since the motor can be flattened, high inertia can be obtained. The motor has generally the characteristic of lowspeed-high torque.

However, the above-described motor has the disadvantages that the assembling is troublesome, the efficiency is not satisfactory, and the support for its rotary shaft is unstable.

OBJECTS AND SUMMARY OF THE INVENTION

Accordingly, it is an object of this invention to provide a bursh-less DC motor which overcomes the above described disadvantages of the conventional brush-less DC motor.

Another object of this invention is to provide a brush-less DC motor which can be ideally flattened.

A further object of this invention is to provide a brush-less DC motor which can be applied most suitably to a tape recorder of the capstan direct drive type.

A still further object of this invention is to provide a brush-less DC motor in which a rotary shaft can be suitably supported by bearings.

A still further object of this invention is to provide a brush-less DC motor in which power loss is reduced.

In accordance with one aspect of this invention, a brush-less DC motor includes a stator member; a stationary cylindrical member projected from the stator member and having bearings on its inner circumferential surface; a rotary shaft being rotatably supported by the bearings of the stationary cylindrical member; a rotary cylindrical member into which the stationary cylindrical member is inserted, and to which the rotary shaft is fixed; at least two rotary discs of magnetic material, fixed to the rotary cylindrical member and spaced from each other; a permanent magnet fixed to at least one of the rotary discs; a rotational position detecting member; a coil assembly including a plurality of coil units; the working point of the rotary shaft being nearer to the stationary cylindrical member than to the rotary cylindrical member.

The above and other objects, features and advantages of this invention, will be apparent in the following detailed description of illustrative embodiments which are to be read in connection with the accompanying drawings.

BRIEF DESCRIPTIONS OF THE DRAWINGS

FIG. 29 is a plan view of another part of the modification of FIG. 28;

FIG. 30A and FIG. 30B are cross-sectional views taken along the lines XXXA—XXXA and XXXB—XXXB of FIG. 28 and FIG. 29, showing the assembling step of the modification of FIG. 28 and FIG. 29;

DESCRIPTION OF THE PREFERRED EMBODIMENTS

A flat brushless direct-current motor according to one embodiment of this invention, which are applied to a tape recorder, will be described with reference to the drawings.

Figure 1:
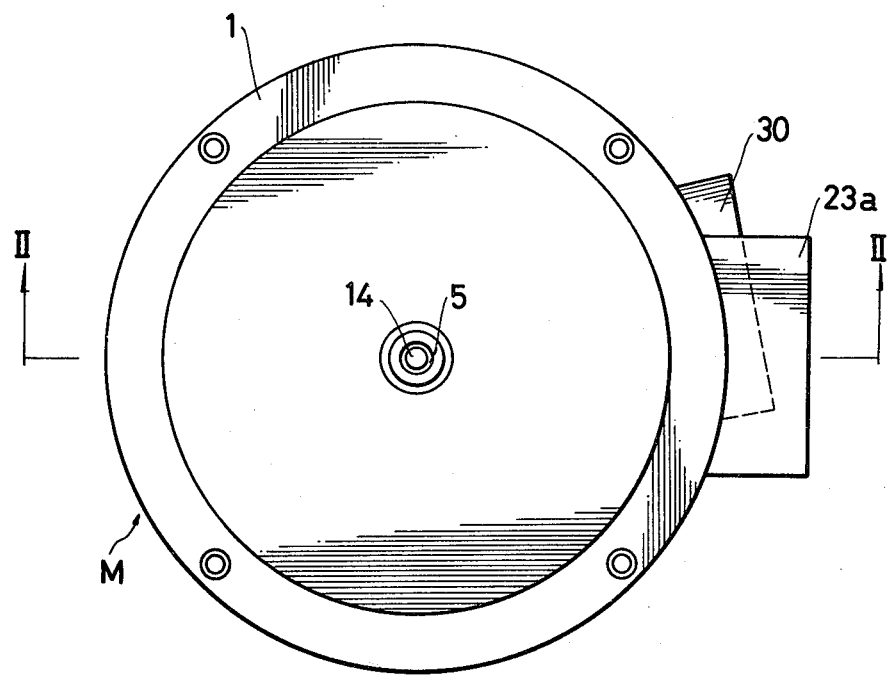
FIG. 1 is a plan view of the whole of a brush-less DC motor according to one embodiment of this invention.
Figure 2:
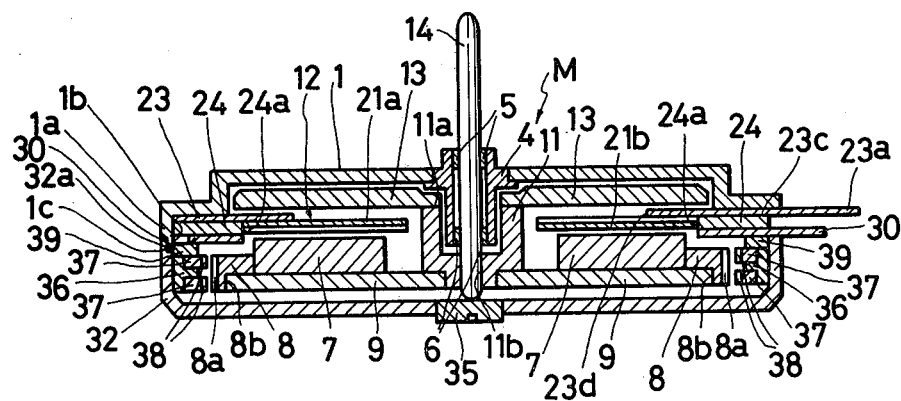
FIG. 2 is a cross-sectional view taken along the line II—II of FIG. 1.

FIG. 1 is a plan view of a flat brushless direct-current motor M, and FIG. 2 is a cross-sectional view, taken along the line II—II of FIG. 1. Next, the construction of the brush-less direct-current motor will be described in the sequence of the assembling steps.

Figure 3A:
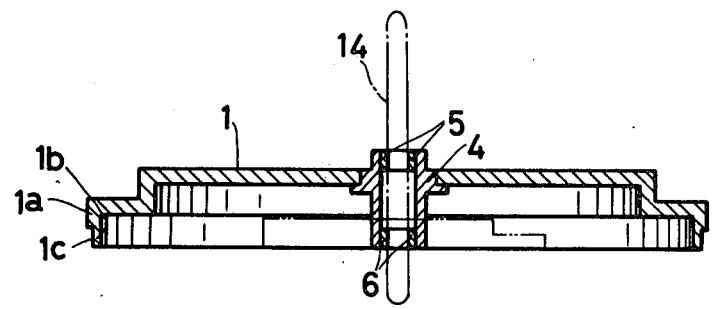
FIG. 3A and FIG. 3B are a cross-sectional view and an elevational view of an upper casing of the motor of FIG. 2, respectively.
Figure 3B:
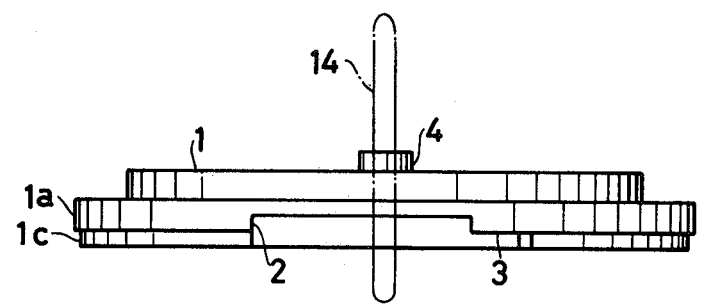

Referring to FIG. 1 to FIG. 3, an upper casing 1 is manufactured of soft magnetic material (mainly Fe-group), and functions as an electro-magnetically shielding member to the exterior. Larger and smaller cut-out portions 2 and 3 conjoined with each other are formed in a stepped circumferential surface 1a of the upper casing 1. A stationary cylindrical member 4 is press-fitted to a central opening of the upper casing 1. The cylindrical member 4 is formed, for example, of soft magnetic material. Cylindrical bearings 5 and 6 formed of oleo sintered copper alloy are fixed to the upper and lower inner surfaces of the stationary cylindrical member 4. The cylindrical member 4 fitted to the upper casing 1 is subjected to the centering operation with respect to the bearings 5 and 6.

Figure 4:
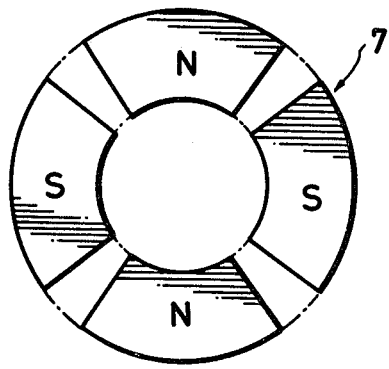
FIG. 4 and FIG. 5 are plan views of examples of permanent magnets which can be employed for one embodiment of this invention, of which the permanent magnet of FIG. 4 is employed for this embodiment.
Figure 5:
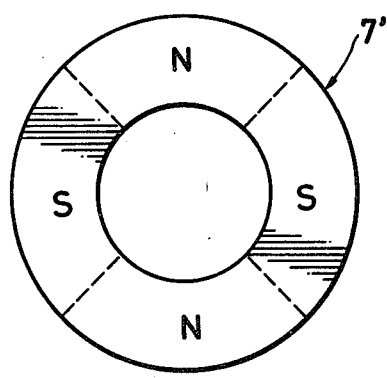

FIG. 4 and FIG. 5 show permanent magnets 7 and 7' which may be alternatively employed for this embodiment. The permanent magnet 7 of FIG. 4 consists of four magnetized sectors. The permanent magnet 7' of FIG. 5 consists of four-pole magnetized ring. The permanent magnet 7 of FIG. 4 is used in this embodiment.

Next, a lower rotary ring assembly 10 will be described with reference to FIG. 6A and FIG. 6B.

The sector magnets 7 are positioned at the angularly regular intervals by a positioning ring 8 formed of dimmensionally accurate electric-insulating material, for example, BMC (bulk mold compound) material. The N-pole sector magnet 7 and the S-pole sector magnet 7 are alternately arranged. The positioning ring 8 is provided with four inward projections 8C. The respective sector magnets 7 are fitted between the projections 8C. A lower rotary ring 9 of soft magnetic material (mainly Fe-group) is fixed to the lower surfaces of the sector magnets 7 and to the inner circumferential surface 8b of the positioning ring 8. Thus, the lower ring assembly 10 is obtained. Teeth 8a for rotational speed detecting are made in the outer circumferential surface of the positioning ring 8. Metal is vapor-deposited or plated on the teeth 8a. When the magnet 7' of FIG. 5 is used in this embodiment, the inward projections 8C are omitted from the positioning ring 8.

Figure 6A:
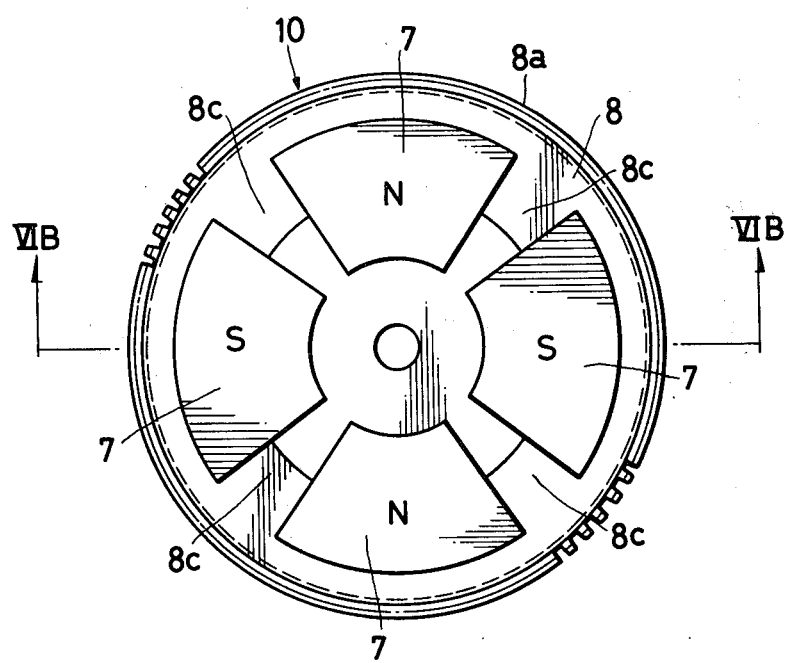
FIG. 6A is a plan view of a lower rotary ring assembly of the motor of FIG. 2.
Figure 6B:
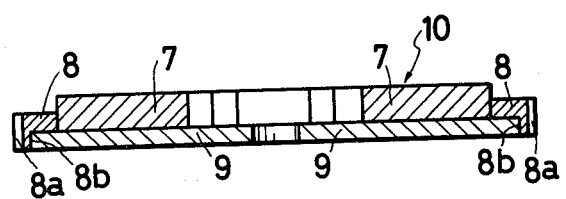
FIG. 6B is a cross-sectional view taken along the line VIB—VIB of FIG. 6A.
Figure 7:
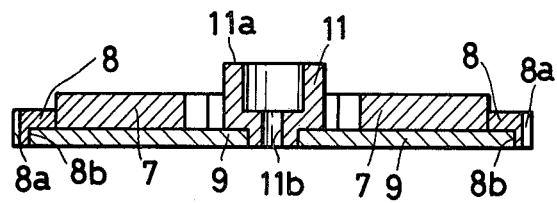
FIG. 7 is a cross-sectional view showing the lower rotary ring assembly of FIG. 6B provided with a rotary cylindrical member.

Next, a rotary cylindrical member 11 shown in FIG. 7 is press-fitted to the central opening of the lower rotary ring 9 of the lower rotary ring assembly 10 shown in FIG. 6A and FIG. 6B. The rotary cylindrical member 11 is made of non-magnetic material such as brass.

Figure 8:
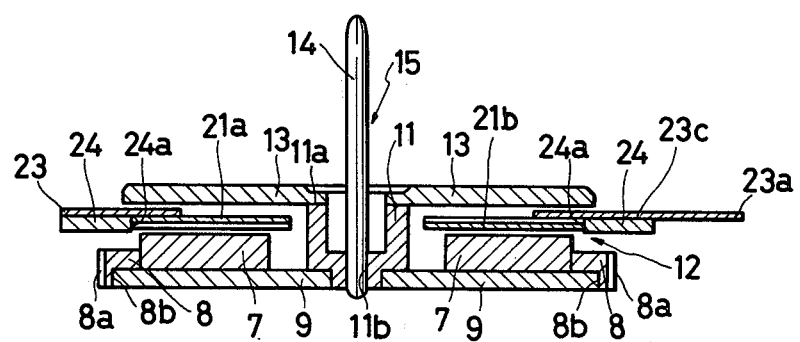
FIG. 8 is a cross-sectional view of a rotor assembly of the motor of FIG. 2, in which a coil assembly should be omitted from the rotor assembly.

Then, after the rotary cylindrical member 11 is inserted into a coil assembly 12 shown in FIG. 12 to be described hereinafter in detail, an upper rotary ring 13 made of soft magnetic material is fixed at its inner circumferential surface to an upper end surface 11a of the rotary cylindrical member 11 by screws. A rotary shaft 14, namely a capstan shaft according to this embodiment is fixed to a central opening 11b of the rotary cylindrical member 11. Thus, a rotor assembly 15 except the coil assembly 12 is obtained as shown in FIG. 8.

Figure 9:
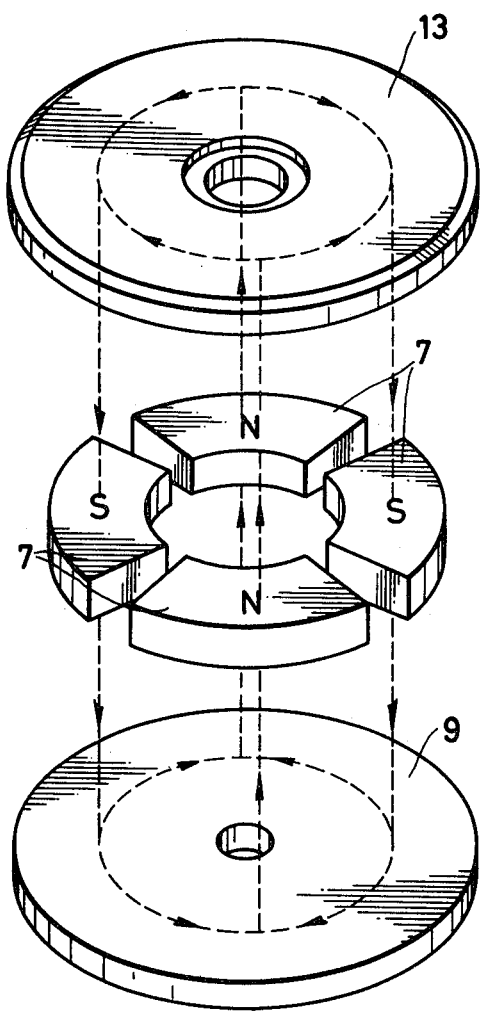
FIG. 9 is an exploded perspective view of an important part of the rotor assembly of FIG. 8, in which paths of magnetic flux are shown.

The paths of magnetic flux in the thus obtained rotor assembly 15 are shown by the dotted lines in FIG. 9. As shown in FIG. 9, the magnetic flux starting from the N-pole flows substantially in paralell with the capstan shaft 14 not shown in FIG. 9, flows through the upper or lower rotary ring 13 or 9 and then flows substantially in parallel with the capstan shaft 14 to terminate at the S-pole.

Next, the detail of the coil assembly 12 will be described with reference to FIG. 10 to FIG. 13.

Figure 12:
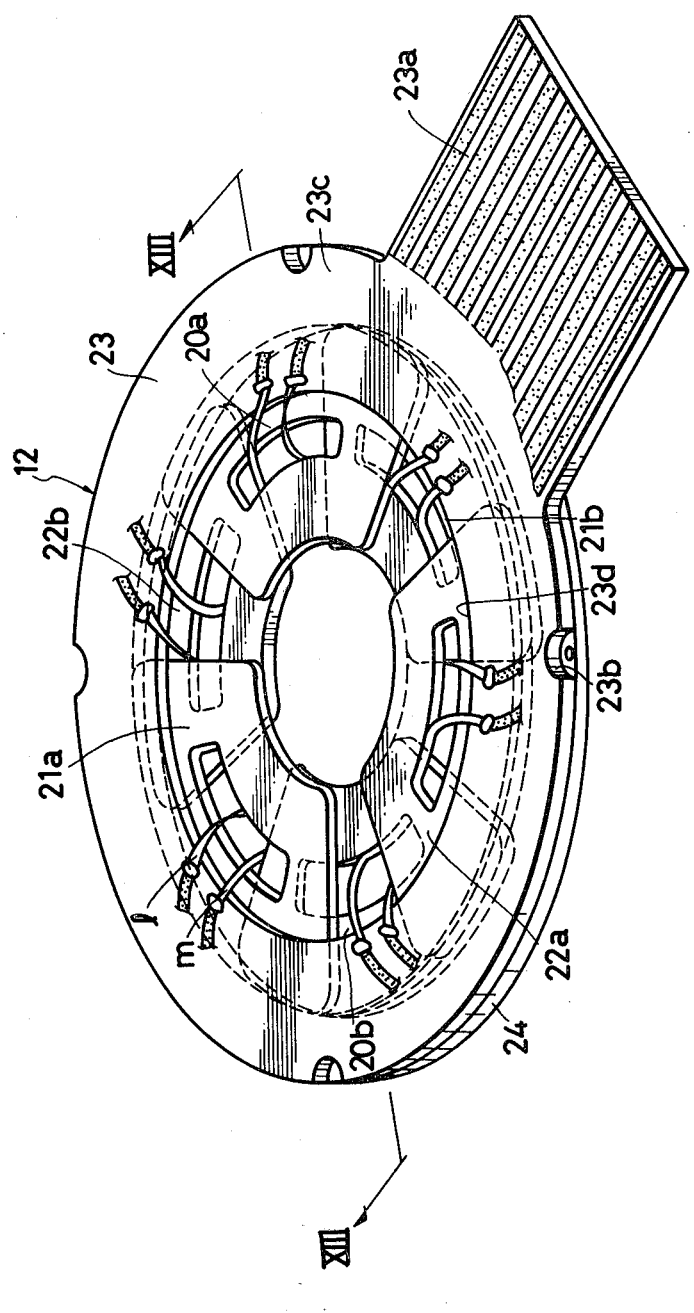
FIG. 12 is an enlarged perspective view of the coil assembly of the motor of FIG. 2.

As clearly shown in FIG. 12, the coil assembly 12 consists of six substantially sectorial coil units 20a, 20b, 21a, 21b, 22a, and 22b for the four-pole magnet, a printed plate 23, and a coil-positioning ring 24. The printed plate 23 consists of a projecting terminal portion 23a for electrically connecting the coil units 20a to 22b to a drive circuit, and a lead-connecting ring portion 23c for connecting the lead terminals of the coil units to the printed plate 23 on which necessary circuits are printed and insulated. The diameter of the central opening 23d of the printed plate 23 is smaller than that of the central opening 24a of the coil-positioning ring 24. The printed plate 23 and the coil-positioning ring 24 are fixed to each other by adhesive in such a manner that the central openings 23d and 24a of the printed plate 23 and coil-positioning ring 24 are concentric with each other. A circular recess is formed by the lower surface of the printed plate 23 and the inner circumferential surface of the coil-positioning ring 24. The six coil units 20a to 22b are positioned by the circular recess. The six coil units 20a to 22b are equally divided into upper and lower groups, and the coil units of the upper group are overlapped on those of the lower group so that the six coil units are arranged at the angularly regular intervals of 60 degrees. The outer circular surfaces of the coil units are contacted with the inner circumferential surface of the coil-positioning ring 24. The coil units 20a and 20b are arranged diametrially to each other. Similarly, the coil units 21a and 21b, and 22a and 22b are arranged diametrically to each other, respectively.

Figure 11:
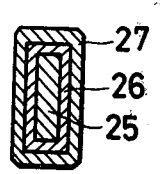
FIG. 11 is a cross-sectional view taken along the line XI—XI of FIG. 10.
Figure 10:
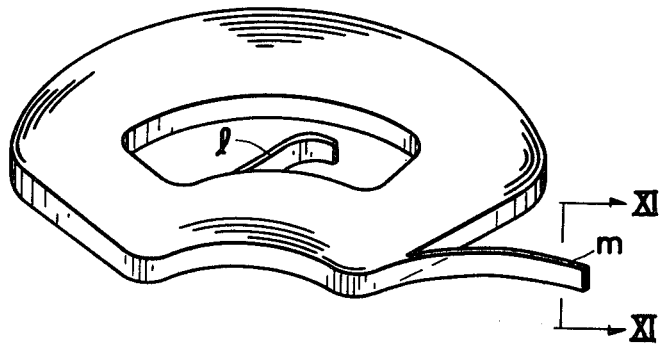
FIG. 10 is an enlarged perspective view of a coil unit to be applied to the coil assembly of the motor of FIG. 2.

The coil unit is enlarged shown in FIG. 10. It is formed by winding a conductive wire of the flat type whose cross-section is shown in FIG. 11. Such a wire is generally called, "oval wire" or "stream-lined wire." As shown in FIG. 11, an insulating layer 26 is deposited on a conductive core 25 formed of copper, and further a meltable insulating layer 27 is deposited on the insulating layer 26, in the conductive wire. The sectorial coil unit after wound up is hardened with heat or chemical solvent.

Figure 13:
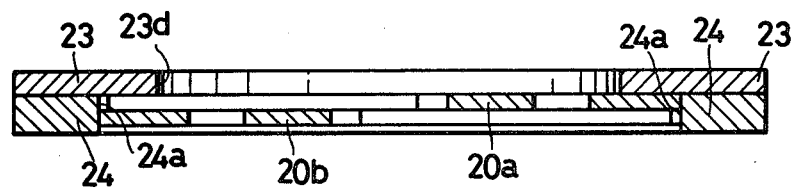
FIG. 13 is a cross-sectional view taken along the line XIII—XIII of FIG. 2.

The six coil units 20a to 22b thus manufactured are so positioned as above described, in the coil assembly 12. The double of the thickness of the coil unit is slightly smaller than the thickness of the coil-positioning ring 24, as shown in FIG. 13. The coil units 20a to 22b are fixed at the overlapping portions to each other, and further fixed to the inner circumferential surface of the coil-positioning ring 24 and the lower surface of the printed plate 23, by adhesive. Thus, the whole coil assembly 12 is reinforced with such fixation and the coil-positioning ring 24.

The initial ends l of the conductive wires of the coil units and the terminal ends m thereof are soldered to the circuit (partially shown in FIG. 12) printed on the lead-connecting ring portion 23c of the printed plate 23. Screw holes 23b for fixing the coil assembly 12 to the upper casing 1 are made in the periphery of the coil assembly 12. The printed circuits are insulated in the conventional manner.

After the coil assembly 12 is arranged in the position shown in FIG. 8, the stationary cylindrical member 4 fixed to the upper casing 1 (FIG. 3A and FIG. 3B) is inserted into the rotary cylindrical member 11 assembled in the rotor assembly 15 (FIG. 8), and the capstan shaft 14 is inserted through the stationary cylindrical member 4 to be rotatably supported on the bearings 5 and 6. The coil assembly 12 is fixed to the upper casing 1 by means of the screw holes 23b. The projecting terminal portion 23a of the printed plate 23 of the coil assembly 12 is projected through the cut-out portion 2 made in the stepped circumferential surface 1a of the upper casing 1, as shown in FIG. 1 and received by the cut-out portion 2.

Figure 14:
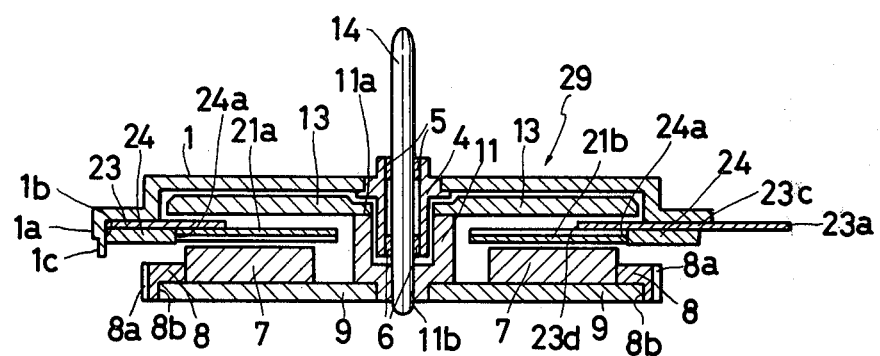
FIG. 14 is a cross-sectional view of a rotor-stator assembly of the motor of FIG. 2.
Figure 15:
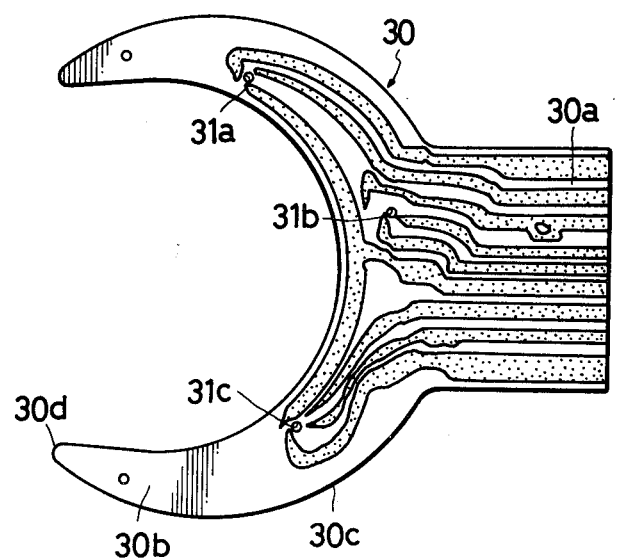
FIG. 15 is an enlarged plan view of a rotational-position detecting plate of the motor of FIG. 2.

Thus, a rotor-stator assembly 29 shown in FIG. 14 is obtained. A rotational-position detecting plate 30 shown in FIG. 15 is further assembled into the assembly 29 in such a manner that the detecting plate 30 is contacted with the lower surface of the coil-positioning ring 24. Necessary circuit is printed on the detecting plate 30 which is substantially in fork-like shape, and consists of a projecting terminal portion 30a and a circular-arc shaped guide portion 30b. Three position detecting elements, for example, Hall-elements 31a, 31b and 31c are fixed on the guide portion 30b at the angular intervals of 60 degrees round the capstan shaft 14 which is not shown in FIG. 15. Since the detecting plate 30 defines a cut-out portion 30d, it can be inserted into the rotor-stator assembly 29 of FIG. 14 under the coil assembly 12, and it is radially positioned at the periphery 30c by the inner circumferential surface 1b of the upper casing 1. The projecting terminal portion 30a of the detecting plate 30 is passed through the cut-out portions 2 and 3 made in the stepped circumferential surface 1a of the upper casing 1 communicating each other. As clearly shown in FIG. 1, it is projected from the upper casing 1. Accordingly, the detecting plate 30 can be easily slided in the peripheral direction within the range of the cut-out portions 2 and 3.

While the rotor assembly 15 is rotated with the energization of the coil units—the principle of the motor drive will be described hereinafter—, the angular position of the detecting plate 30 is adjusted. The detecting plate 30 is fixed relative to the upper casing 1 at the position at which the current flowing through the coil units is at the minimum. The fixation of the detecting plate 30 may be effected in a suitable manner. For example, it may be effected in such a manner that screws are inserted through oblong holes (not shown) made in the guide portion 30b of the detecting plate 30 to be engaged with threaded holes (not shown) made in the coil-positioning ring 24 of the coil assembly 12 which is already fixed to the upper casing 1. Or it may be effected in such a manner that a ring member 39 (shown in FIG. 2) made of insulating material and arranged under the detecting plate 30 is screwed to the inner circumferential surface 1b of the upper casing 1 to press the detecting plate 30 between the coil assembly 12 and the insulating ring member 39. The motor can be driven at the optimum condition by the above described angular adjustment of the detecting plate 30.

After the detecting plate 30 is assembled into the rotor-stator assembly 29 of FIG. 14, a pair of stator-side speed-detecting ring heads 37 made of metal (shown in FIG. 2) and insulated from each other by an insulating ring 36 having T shaped-cross section is fixed to the insulating ring member 39 which is already fixed relative to the upper casing 1. Teeth 38 are made in the inner circumferential surfaces of the stator-side speed detecting ring heads 37, and are opposed to the teeth 8a of the positioning ring 8.

Figure 16A:
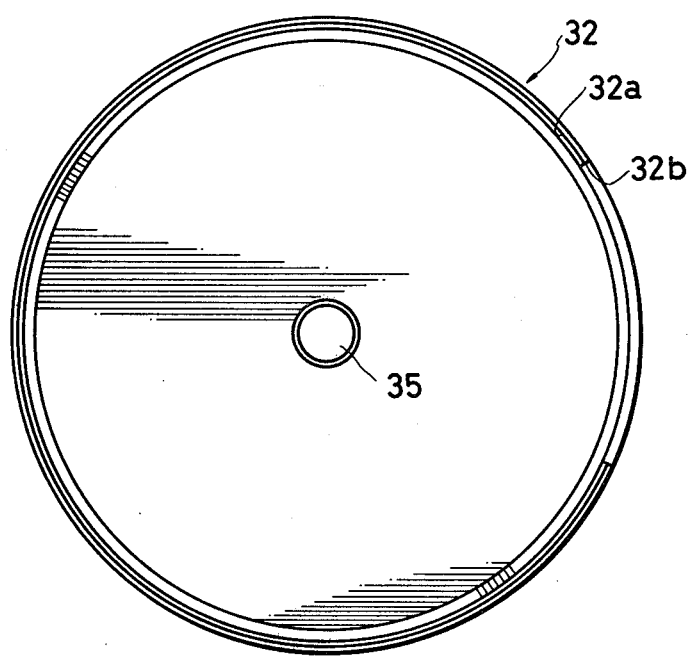
FIG. 16A and FIG. 16B are a plan view and an elevational view of a lower casing of the motor of FIG. 2.
Figure 16B:
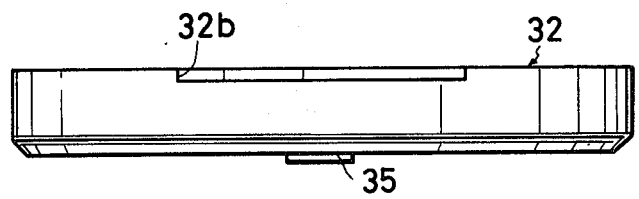

Next, a lower casing 32 shown in FIG. 16A and FIG. 16B is engaged with the upper casing 1 into which the different parts are already assembled. The lower casing 32 is made of soft magnetic material like the upper casing 1. A circular cut-out portion 32a is made in the periphery of the lower casing 32, and it is fitted to the stepped portion 1c in the stepped circumferential surface 1a of the upper casing 1 to engage the lower casing 32 with the latter. Further, a cut-out portion 32b is made in the upper edge of the lower casing 32. When the lower casing 32 is engaged with the upper casing 1, the cut-out portion 32b is communicated with the cut-out portions 2 and 3 of the upper casing 1 from which the projecting terminal portions 23a and 30a of the coil assembly 12 and the rotational-position detecting plate 30 are projected as shown in FIG. 1. An adjusting screw 35 is fitted to the center of the bottom of the lower casing 32. The vertical position of the rotor assembly 15 is adjusted with the rotation of the adjusting screw 35. Thus, the assembling of the flat brush-less DC motor M is completed.

Next, the principle of the motor drive will be described.

There will be considered the case that the rotational-position detecting plate 30 is so attached to the coil assembly 12 that the Hall elements 31a, 31b and 31c of the detecting plate 30 correspond to the coil units 22a, 21b and 20a (see FIG. 12 and FIG. 15), respectively. Leakage magnetic flux from the permanent magnet 7 fixed on the lower rotary ring 9 is sensed by the detecting plate 30. The first Hall element 31a detects that the leakage magnetic flux in one direction is applied to the coil unit 22a. A first electronic switching element (hereinafter described) is turned on with the detecting output of the first Hall element $31a$, to pass such a current through the coil unit $22a$ and the coil unit $22b$ arranged diametrically to the coil unit $22a$ as to impart the rotational forces in the same direction to the rotary assembly 15. When the rotary assembly 15 further rotates by 60 degrees, the leakage magnetic flux in the one direction is applied to the second Hall element $31b$. A second electronic switching element is turned on, while the first electronic switching element is turned off, with the detecting output of the second Hall element $31b$. Such a current is passed through the coil unit $21b$ and the coil unit $21a$ arranged diametrically to the coil unit $21b$ as to impart the rotational forces in the same direction to the rotary assembly 15. When the rotary assembly 15 further rotates by 60 degrees, the leakage magnetic flux in the one direction as above described is applied to the third Hall element $31c$. A third electronic switching element is turned on, while the second electronic switching element is turned off, with the detecting output of the third Hall element $31c$. Such a current is passed through the coil unit $20a$ and the coil unit $20b$ arranged diametrically to the coil unit $20a$ as to impart the rotational forces in the same direction to the rotary assembly 15. And when the rotary assembly 15 still further rotates by 60 degrees, namely rotates by 180 degree from the initial position at which the leagage magnetic flux in the one direction is applied to the coil unit $22a$, the leakage magnetic flux in the same direction as the above-described one direction is again applied to the first Hall element $31a$ and the coil unit $22a$, since the permanent magnet sectors 7 of the same polarity are arranged diametrically to each other as clearly shown in FIG. 6A. Thus, the above-described operations are repeated. Each of the coil units is energized twice for each revolution of the rotor assembly 15, with the change-over of the three electronic switching elements to continue the rotation of the rotary assembly 15.

Figure 17:
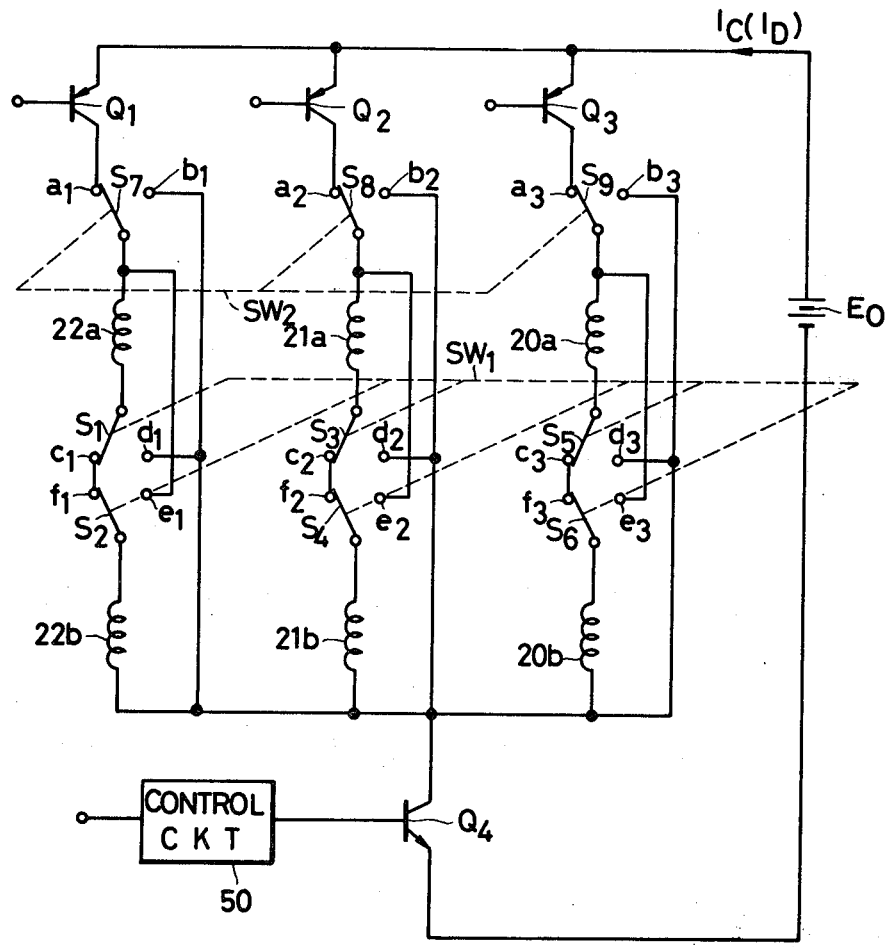
FIG. 17 is a circuit diagram of a drive circuit for the motor of FIG. 2.

A drive circuit shown in FIG. 17 is used for the above described brushless DC motor M which is applied to a tape recorder. Next, the circuit of FIG. 17 will be described.

In the circuit of FIG. 17, transistors $Q_1$, $Q_2$ and $Q_3$ function as the above-described first, second and third electronic switching elements. The bases of the transistors $Q_1$, $Q_2$ and $Q_3$ are electrically connected to the terminal portion $30a$ of the rotational-position detecting plate 30 of FIG. 15. The emitters of the transistors $Q_1$, $Q_2$ and $Q_3$ are connected in common with a battery $E_0$ as a DC voltage source. Stationary contacts $a_1$, $a_2$ and $a_3$ of motor starting/stopping switches $S_7$, $S_8$ and $S_9$ are connected to the collectors of the transistors $Q_1$, $Q_2$ and $Q_3$, respectively. Other stationary contacts $b_1$, $b_2$ and $b_3$ of the motor starting-stopping switches $S_7$, $S_8$ and $S_9$ are connected to stationary contacts $d_1$, $d_2$ and $d_3$ of first series-parallel change-over switches $S_1$, $S_3$ and $S_5$, and to terminals of the coil units $22b$, $21b$ and $20b$, respectively which are connected in common with each other. Movable contacts of the motor starting/stopping switches $S_7$, $S_8$ and $S_9$ are connected to terminals of the coil units $22a$, $21a$ and $20a$, and to stationary contacts $e_1$, $e_2$ and $e_3$ of second series-parallel change-over switches $S_2$, $S_4$ and $S_6$, respectively. Other terminals of the coil units $22a$, $21a$ and $20a$ are connected to movable contacts of the first series-parallel change-over switches $S_1$, $S_3$ and $S_5$. Other stationary contacts $c_1$, $c_2$ and $c_3$ of the first series-parallel change-over switches $S_1$, $S_3$ and $S_5$ are connected to other stationary contacts $f_1$, $f_2$ and $f_3$ of the second series-parallel change-over switches $S_2$, $S_4$ and $S_6$. Movable contacts of the second series-parallel changeover switches $S_2$, $S_4$ and $S_6$ are connected to other terminals of the coil units $22b$, $21b$ and $20b$, respectively.

The common terminals of the coil units $22b$, $21b$ and $20b$ are connected to the collector of a control transistor $Q_4$. A speed control circuit 50 is connected to the base of the control transistor $Q_4$. The emitter of the control transistor $Q_4$ is connected to the battery $E_0$.

Figure 18:
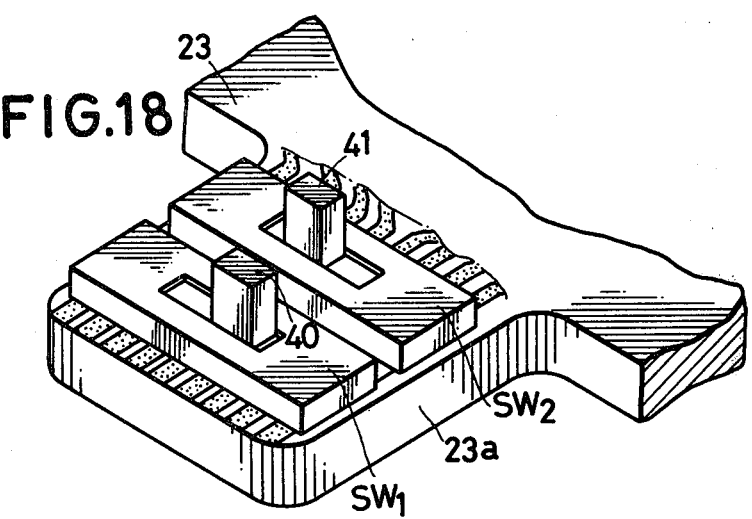
FIG. 18 is an enlarged perspective view of a part of the motor of FIG. 2.

The movable contacts of the motor starting/stopping switches $S_7$, $S_8$ and $S_9$ are ganged with each other, and actuated by a common start/stop slide switch $SW_2$ shown by the dotted lines in FIG. 17 which is arranged, for example, on the terminal portion $23a$ of the printed plate 23 of the coil assembly 12 in the manner shown in FIG. 18. The movable contacts of the switches $S_7$, $S_8$ and $S_9$ are simultaneously connected to the first stationary contact $a_1$, $a_2$ and $a_3$ or to the second stationary contacts $b_1$, $b_2$ and $b_3$, by the common start/stop slide switch $SW_2$.

The movable contacts of the series-parallel change-over switches $S_1$ to $S_6$ are ganged with each other, and actuated by a common series-parallel change-over slide switch $SW_1$ shown by the dotted lines in FIG. 17 which is arranged at the side of the slide switch $SW_2$, for example, on the terminal portion $23a$ of the printed plate 23 of the coil assembly 12 in the manner shown in FIG. 18. The movable contacts of the switches $S_1$ to $S_6$ are simultaneously connected to the first stationary contacts $c_1$, $f_1$, $c_2$, $f_2$, $c_3$ and $f_3$ or to the second stationary contacts $d_1$, $e_1$, $d_2$, $e_2$, $d_3$ and $e_3$ by the common series-parallel change-over slide switch $SW_2$.

The slide switches $SW_1$ and $SW_2$ can be manually operated by knobs 40 and 41. However, the knobs 40 and 41 of the slide switches $SW_1$ and $SW_2$ may be interconnected with a reproducing push-button, a fast-forwarding push-button, a rewind push-button, and a stop push-button of a tape recorder to which the brush-less DC motor M is applied, to automatically operate the slide switches $SW_1$ and $SW_2$.

Next, operations of the circuit of FIG. 17 will be described. For example, when the reproducing push-button of the tape recorder is depressed, the knobs 40 and 41 of the slide switches $SW_1$ and $SW_2$ are actuated by not-shown interlocking members such as levers. The movable contacts of the motor starting/stopping switches $S_7$, $S_8$ and $S_9$ are connected to the first stationary contacts $a_1$, $a_2$ and $a_3$, and at the same time, the movable contacts of the series-parallel change-over switches $S_1$ to $S_6$ are connected to the first stationary contacts $c_1$, $f_1$, $c_2$, $f_2$, $c_3$ and $f_3$, Thus, the coil unit $22a$ is connected in series with the coil unit $22b$, the coil unit $21b$ is connected in series with the coil unit $21a$, and the coil unit 20 a is connected in series with the coil unit $20b$. The coil units are connected to the transistors $Q_1$, $Q_2$ and $Q_3$. As above described, the transistors $Q_1$, $Q_2$ and $Q_3$ as the first, second and third switching elements are turned on and off in order with the detecting outputs of the Hall elements $31a$ to $31c$ of the detecting plate 30. Current Ic flows through the in-series connected coil units $22a$ and $22b$, $21b$ and $21a$, and $20a$ and $20b$, in order. The rotational speed of the rotor assembly 15 is detected with the change of the capacitance between the teeth $8a$ of the positioning ring 8 and the teeth 38 of the stator-side speed detecting ring head 37. The detecting output from the stator-side speed detecting ring heads 37 is applied to the control circuit 50. The output of the latter is supplied to the base of the transistor $Q_4$. The current Ic, namely the rotational speed of the motor M is so controlled as to be at constant, by the control transistor $Q_4$. Thus, the motor M is rotated at the constant speed for the reproduction.

Next, when the stop push-button of the tape recorder is depressed, the knob 40 of the slide switch $SW_1$ is not actuated, but the knob 41 of the other slide switch $SW_2$ is actuated into another position. The movable contacts of the motor starting/stopping switches $S_7$, $S_8$ and $S_9$ are changed over to the second stationary contacts $b_1$, $b_2$ and $b_3$. Accordingly, the in-series connected coil units 22a and 22b, 21a and 21b, and 20a and 20b are disconnected from the transistors $Q_1$, $Q_2$ and $Q_3$, namely from the battery $E_0$. However a closed loop is formed in each of the in-series connected coil units 22a and 22b, 21a and 21b, and 20a and 20b. A counter electromotive force is induced in each of the coil units to brake the rotor assembly 15. The latter stops instantly.

Next, when the fast-forwarding push-button or the rewind push button of the tape recorder is depressed, the knobs 41 and 40 of the slide switches $SW_2$ and $SW_1$ are actuated with the not-shown interlocking mechanism. The movable contacts of the motor starting/stopping switches $S_7$, $S_8$ and $S_9$ are connected to the first stationary contacts $a_1$, $a_2$ and $a_3$, while the movable contacts of the series-parallel change-over switches $S_1$ to $S_6$ are connected to the second stationary contacts $d_1$, $e_1$, $d_2$, $e_2$, $d_3$ and $e_3$. With the change-over of the swithces $S_1$ to $S_6$, the coil unit 22a is connected in parallel with the coil unit 22b, the coil unit 21a is connected in parallel with the coil unit 21b, and the coil unit 20a is connected in parallel with the coil unit 20b. The in-parallel connected coil units 22a and 22b, 21a and 21b, and 20a and 20b are connected to the transistors $Q_1$, $Q_2$ and $Q_3$. In the above-described manner, the transistors $Q_1$, $Q_2$ and $Q_3$ are turned on and off in order with the detecting outputs of the Hall-elements 31a, 31b and 31c of the detecting plate 30 to pass a current $I_D$ through the in-parallel connected coil units 22a and 22b, 21a and 21b and 20a and 20b, respectively. As the result, the rotor assembly 15 is rotated at the higher speed for the fast-forward mode or the rewind mode. In this case, the speed of the rotor assembly 15 may be controlled with the control transistor $Q_4$ supplied with a higher level control signal. Alternatively, the emitter and collector of the transistor $Q_4$ may be short-circuited with each other. In this case, the speed of the rotor assembly 15 is not controlled.

Next, the advantage of the drive circuit of FIG. 17 will be described with reference to FIG. 19 to FIG. 22.

Generally, the tape recorders are divided into one-motor type, two-motor type and three-motor type from the viewpoint of the number of the drive motors for tape running. In the tape recorder of the three-motor type, two motors are used for driving two reel shafts to supply and take up a magnetic tape, and one motor is used for driving a capstan. In this type, the shafts of the motors may be directly connected to the reel shafts, respectively. Alternatively, mechanical transmission mechanism may be arranged between the motor shafts and the reel shafts. In the tape recorder of the two-motor type, one common motor is used for driveing two reel shafts to supply and take up a magnetic tape, and one motor is used for driving a capstan. Mechanical transmission mechanism is arranged between the reel shafts and the shaft of the common motor. The shaft of the one motor functions as the capstan. Finally in the tape recorder of the one motor type, one motor is used for driving the two reel shafts and the capstan. The one motor type is widely employed for a portable tape recorder. In this type, the one motor is combined with different mechanical transmission mechanism so as to transmit the rotational forces to the reel shafts and capstan.

Figure 20:
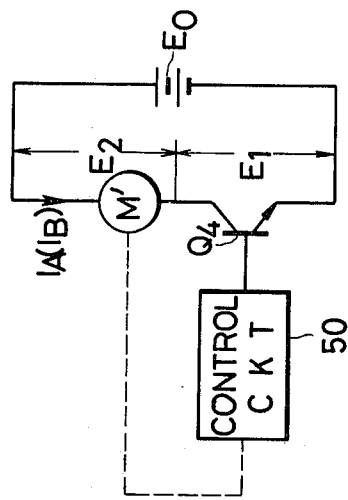
FIG. 20 is a circuit diagram equivalent to the circuit of FIG. 19.
Figure 19:
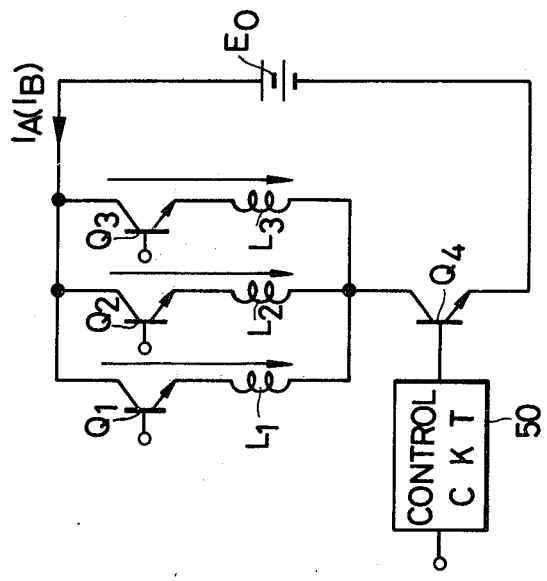
FIG. 19 is a circuit diagram of a conventional brush-less DC motor for explaining the advantage of the drive circuit of FIG. 17.

For comparison with the embodiment of this invention, the drive circuit of the conventional one-motor type is shown in FIG. 19 and FIG. 20. Next, operation of the drive circuit of FIG. 19 will be described to understand the advantage of the drive circuit of FIG. 17 according to the embodiment of this invention. Parts in FIG. 19 which correspond to the parts in FIG. 17, are denoted by the same reference numerals or letters.

In FIG. 19, three coil units $L_1$, $L_2$ and $L_3$ are connected in series with the transistors $Q_1$, $Q_2$ and $Q_3$, respectively. The transistors $Q_1$, $Q_2$ and $Q_3$ are turned on and off in order with the detecting outputs of the position detecting elements, applied to the bases of the transistors $Q_1$, $Q_2$ and $Q_3$. In the play mode of the tape recorder, a control signal of a predetermined level is supplied to the base of the control transistor $Q_4$ from the control circuit 50, and a current $I_A$ flows through the coil units $L_1$, $L_2$ and $L_3$ in order. The voltage drops across the transistors $Q_1$, $Q_2$ and $Q_3$ are neraly zero. Accordingly, the circuit of FIG. 19 can be expressed as the circuit of FIG. 20. When the current $I_A$ flows through the control transistor $Q_4$, the voltage drop across the transistor $Q_4$, as a control loss, amounts to $E_1$. Accordingly, the terminal voltage $E_2$ of the conventional motor M' is expressed by the following equation:
$$E_2 = E_0 - E_1.$$

With the control loss by the control transistor $Q_4$, the motor M' is rotated at the low speed for the play mode.

When the tape recorder is changed over into the fast-forward mode or the rewind mode, a control signal of a higher level is supplied to the base of the control transistor $Q_4$, or the emitter and collector of the control transistor $Q_4$ are short-circuited with each other. A current $I_B$ flows through the motor M'. The voltage drop $E_1$ across the control transistor $Q_4$ is nearly zero. Accordingly, the terminal voltage $E_2$ of the motor M' is mearly equal to the voltage $E_0$ of the power source. The motor M' is rotated at the high speed for the fast-forward mode or rewind mode.

Figure 21:
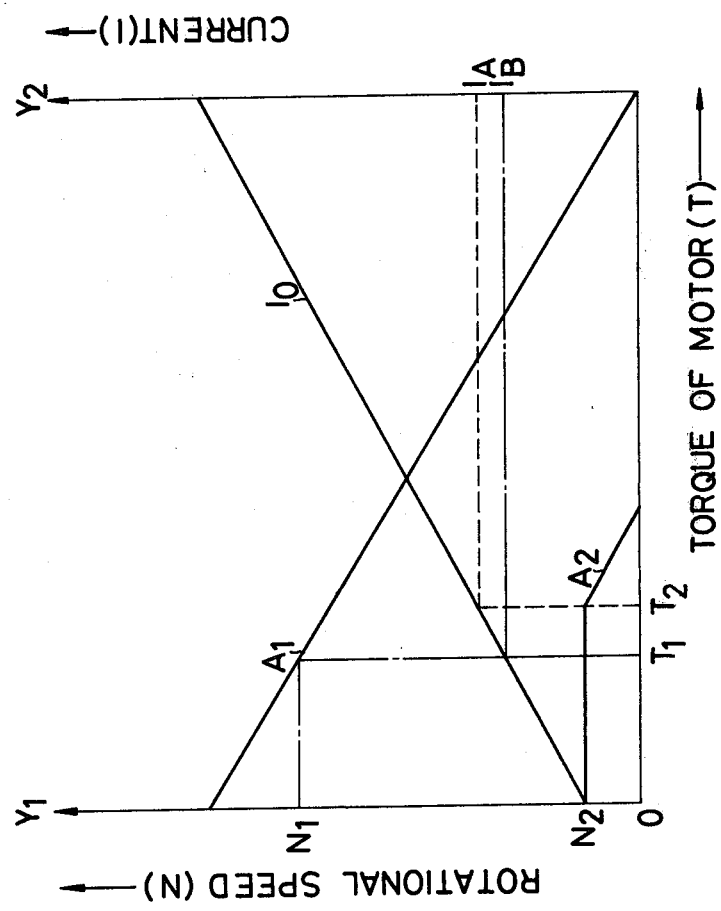
FIG. 21 is graphs showing the output characteristics of the conventional motor.

FIG. 21 shows the output characteristics of the above-described motor M'. In FIG. 21, an abscissa represents the torque T of the motor M', a first ordinate $Y_1$ represents the rotational speed N of the motor M', and a second ordinate $Y_2$ represents the current I flowing through the motor M'. In the graphs of FIG. 21, a curve $I_0$ shows the relationaship between the torque T of the motor M' and the load current flowing through the motor M'. A curve $A_1$ shows the relationship between the torque of the motor M' and the rotational speed of the motor M' when the terminal voltage of the motor M' is nearly equal to $E_0$. And a curve $A_2$ shows the relationship between the torque of the motor M' and the rotational speed of the motor M' when the rotational speed of the motor M' is controlled to the constant speed $N_2$.

When the maximum torque regquired to run the tape at the low speed $N_2$ is $T_2$, the current flowing through the motor M' amounts to $I_A$. And when the torque required to run the tape at the high speed $N_1$ is $T_1$, the current flowing through the motor M' amounts to $I_B$. If the speed of the motor M' is not controlled in the fast-forward mode or rewind mode, it varies with the torque of the motor M'.

In this case, the rotational speed $N_1$ is considered to represent the mean value.

Table I shows the motor inputs and the control losses in the play mode or record mode, and the fast-forward mode or rewind mode, for the conventional motor M'.

Table I

| | |
|---|---|
| Motor input in play or record mode | $E_2I_A$ |
| Control loss in play or record mode | $(E_0-E_2)I_A$ |
| Motor input in fast-forward or rewind mode | $E_0I_B$ |
| Control loss in fast-forward or rewind mode | Negligible small |

Generally, it is required for the tape recorder that the motor is rotated at the desired high speed within the range of the guaranteed voltage of the battery. When the motor is larger-sized and the speed of the motor is controlled to $N_1$, the control loss in the play or record mode increases.

In some of the tape recorders, a speed-increasing mechanism interconnected with the motor is arranged to obtain the desired high speed. However, such a tape recorder is complicated in construction.

Figure 22:
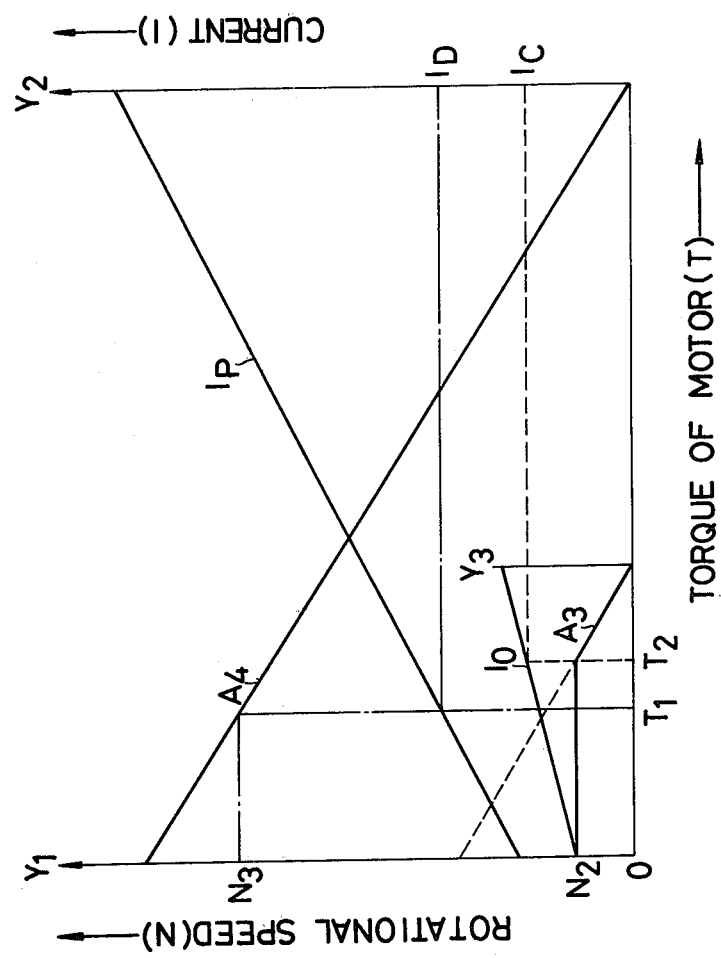
FIG. 22 is graphs showing the output characteristics of the motor according to one embodiment of this invention.

FIG. 22 shows the output characteristics of the motor M according to the embodiment of this invention. In FIG. 22, an abscissa represents the torque T of the motor, a first ordinate $Y_1$ represents the rotational speed N of the motor, a second ordinate $Y_2$ represents the current flowing through the motor where the coil units 22a and 22b, 21a and 21b, and 20a and 20b are in parallel with each other, respectively, and a third ordinate $Y_3$ represent the current flowing through the motor where the coil units 22a and 22b, 21a and 21b, and 20a and 20b are in series with each other, respectively. The current flowing through the in-parallel connected coil units is about four times as high as the current flowing through the in-series connected coil units. In the graphs of FIG. 22, a curve $I_P$ shows the relationship between the torque T of the motor and the load current flowing through the motor where the paired coil units are connected in parallel with each other. A curve $A_4$ shows the relationship between the torque T of the motor and rotational speed of the motor where the terminal voltage of the motor is neary equal to $E_0$ and the paired coil units are connected in parallel with each other. A curve $I_0$ shows the relationship between the torque T of the motor and the current flowing through the motor where the paired coil units are connected in series with each other. And a curve $A_3$ shows the relationship between the torque T of the motor and the rotational speed of the motor when the paired coil units are connected in series with each other, and the rotational speed of the motor is controlled to the constant speed $N_2$. The rotational speed $N_3$ is substantially equal to the rotational speed $N_1$ of the above-described conventional motor M'. When the terminal voltage of the motor in the play or record mode is expressed by $E_2'$, the following Table II is obtained from the graphs of FIG. 22.

Table II

| | |
|---|---|
| Motor input in play or record mode | $E_2'I_C$ |
| Control loss in play or record mode | $(E_0-E_2')I_C$ |
| Motor input in fast-forward or rewind mode | $E_0I_D$ |
| Control loss in fast forward or rewind mode | Negligible small |

Next, the power loss of the drive circuit of the conventional motor M' of FIG. 19 will be compared with that of the drive circuit of the motor M of FIG. 17 according to the embodiment of this invention, with reference to Tables I and II.

In the play mode or record mode, $$E_2I_A=E_2'I_C, \text{ and } E_2'>>E_2,$$

therefore, $I_A>>I_C$ and $E_0-E_2>E_0-E_2'$. Accordingly, the relationship between the control losses, namely the power losses by the control transistors $Q_4$, is expressed by the following equation.

$$(E_0-E_2)I_A>>(E_0-E_2')I_C$$

From the above equation, it will be understood that the control loss in the motor according to this embodiment is much smaller than that in the conventional motor, in the play mode or record mode.

In the fast-forward mode or rewind mode, the iron loss in the magnetic circuit of the conventional motor M' is substantially the same as the iron loss in the magnetic circuit of the motor M according to the embodiment, if the construction of the motor M' is the same as that of the motor M. However, the paired coil units are connected in parallel with each other in the motor M according to this embodiment. Accordingly, copper loss of the Motor M is smaller than that of the conventional motor M'. Therefore, the motor input in the fast-forward mode or rewind mode can be substantially reduced in comparison with the conventional motor M'.

Figure 23:
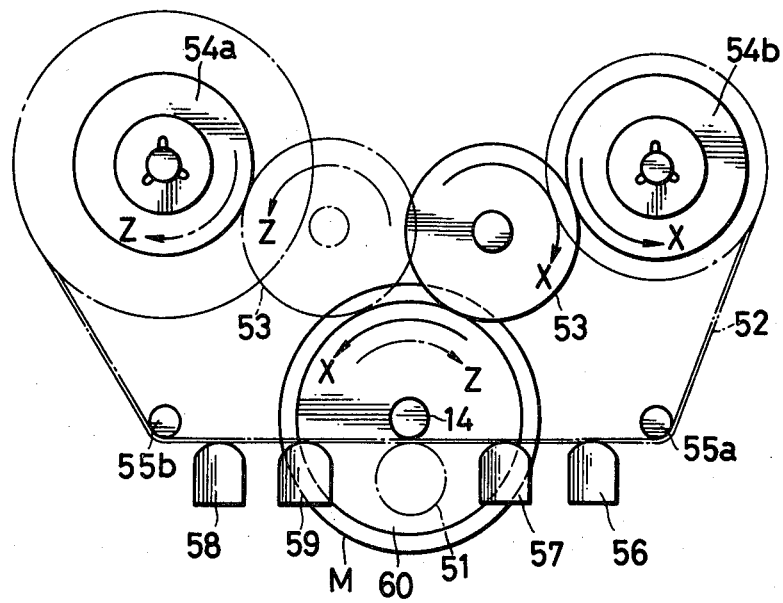
FIG. 23 is a schematic plan view of a tape recorder to which the motor according to one embodiment will be applied.

FIG. 23 shows one example of a rotational force transmission mechanism of a capstan direct-drive type tape recorder to which the motor according to this embodiment of the invention is applied.

The reverse mode is possible according to this tape recorder. An output roller 60 is fixed to the capstan shaft 14. A magnetic tape 52 is pinched between the capstan 14 and a pinch roller 51 to be run thereby. A swingable transmission idler 53 contacts with the output roller 60. The position of the swingable idler 53 can be changed over with a not-shown transmission mechanism inter-locked with the push-buttons of the tape recorder. In the play mode, record mode and fast-forward mode, the idler 53 is interposed between the output roller 60 and a take-up reel mount 54b, as shown by the solid line in FIG. 23, to rotate the take-up reel mount 54b in the X-direction.

In the rewind mode and the reverse mode, the idler 53 is interposed between the output roller 60 and a supply reel mount 54a, as shown by the dot-dah line in FIG. 23, to rotate the supply reel mount 54a in the Z-direction. In this case, the motor M is rotated in the reverse direction with depressing of the associated push button.

The magnetic tape 52 is transported in predetermined tension between tape guide pins 55a and 55b, in the rightward or leftward direction. A recording/reproducing magnetic head 56 and erasing magnetic head 57 for the normal play mode and record mode are arranged between the capstan shaft 14 and the tape guide pin 55a. Another recording/reproducing magnetic head 58 and erasing magnetic head 59 for the reverse mode are arranged between the capstan shaft 14 and the tape guide pin 55b.

The capstan shaft 14, namely the output roller 60 is rotated at the lower speed in the playmode or record mode, in the X-direction. And it is rotated at the higher speed in the fast-forward mode, in the X-direction.

The capstan shaft 14, namely the output roller 60 is rotated at the lower speed in the reverse mode, in the Z-direction. And it is rotated at the higher speed in the rewind mode, in the Z-direction.

The above-described flat brushless DC motor according to one embodiment of this invention has the following merits.

(a). The assembling operation is very simple. The construction can be ideally flattened. The rotary shaft 14 can be stably supported by the bearings 5 and 6, and moreover can be accurately supported thereby with respect to the concentricity of the construction.

(b). Since the rotary cylindrical member 11 combining the upper rotary ring 13 and the lower rotary ring 9 with each other is made of non-magnetic material such as brass, the magnetic flux from the parmanent magnet 7 is not shunted to the rotary cylindrical member 11, it flows effectively only between the upper and lower rotary rings 13 and 9 substantially in parallel with the rotary shaft 14. Magnetomotive force of the magnet 7 can be effectively used for generation of rotational force.

(c). Since the upper and lower rotary rings 13 and 9 between which magnetic attractive force is generated, are combined with each other by the rotary cylindrical member 11, little bending force is applied to the rotary shaft 14 fixed to the center of the bottom of the rotary cylindrical member 11, and so the rotary shaft 14 can be very stably supported by the bearings 5 and 6 fixed on the inner surface of the stationary cylindrical member 4.

(d). Since the distance between the bearings supporting the rotary shaft 14, and the working point of the rotary shaft 14 at which the pinch roller 51 is pressed to the rotary shaft 14 as the capstan to pinch the magnetic tape therebetween, can be so designed as to be the shortest possible, the bending moment to the rotary shaft 14 can be the smallest possible.

(e). The leakage magnetic flux from the permanent magnet 7 is sensed by the detecting elements of the detecting plate 30 to detect the rotational position of the rotor assembly 15. No special magnetic merker for detecting the rotational position is required. The detecting plate 30 can be easily assembled into the motor. For that purpose, a nallow space in the flat brush-less motor can be effectively used. Since the position of the detecting plate 30 can be adjusted in the peripheral direction while the rotor assembly 15 is rotated, the error of the arrangement between the coil units and the position-detecting elements attached to the detecting plate 30 can be compensated, and so the motor can be driven at the optimum condition.

(f). The coil units can be very stably arranged in the coil assembly. The whole thickness of the coil assembly can be the smallest possible. Since the coil units are partially fixed to each other, the coil assembly is stable in construction. Moreover, the coil units can be accurately and stably positioned by the positioning ring 24.

Although there has been described one embodiment of this invention, it should be readily apparent to one of ordinary skill in the art that various modifications in form and details may be made without departing from the spirit and scope of the invention.

Figure 24:
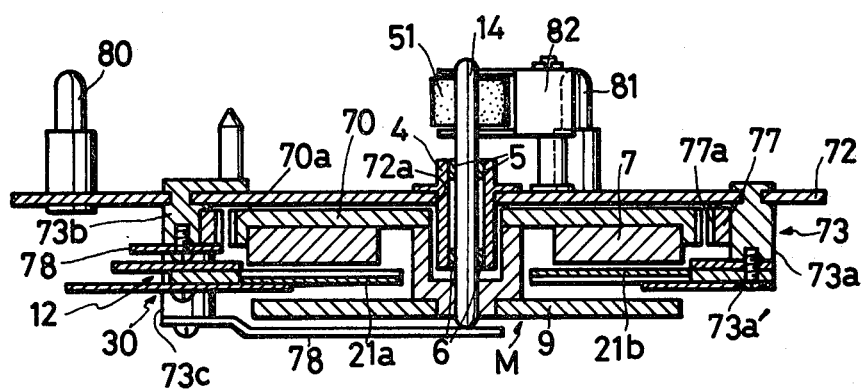
FIG. 24 is a cross-sectional view of one modification of the motor of FIG. 2.

For example, although the stationary cylindrical member 4 having the bearings 5 and 6 are fixed to the upper casing 1 in the above embodiment, it may be fixed to a part of a chassis in a tape recorder. FIG. 24 shows one example of such a modification in which some parts are omitted away. Parts in this modification which correspond to the parts in the above embodiment are denoted by the same reference numerals, and will not be described hereinafter in detail.

In FIG. 24, the stationary cylindrical member 4 is fixed to an opening 72a of a chassis 72 made of iron. The magnets 7 are fixed to an upper dish-like rotary ring 70, and positioned in the manner different from the above embodiment. Teeth 70a are made in the outer circumferential surface of the upper rotary ring 70. A stepped support ring member 73 of synthetic resin is united with the iron chassis 72. The former and latter can be molded as one body by the so-called "outsert molding method." The stepped support ring member 73 consists of first, second and third support portions 73a, 73b and 73c. The coil assembly 12 of FIG. 12 is fixed to the first support portion 73a by screws. The detecting plate 30 is fixed to the coil assembly 12 by screws after the angular position of the detecting plate 30 relative to the coil assembly 12 is adjusted as guided by a circular cut-out recess 73a' of the first support portion 73a. A thrust bearing plate 78 is fixed to the third support portion 73c by screws, and supports the lower end of the capstan shaft 14. A stator-side speed detecting ring head 77 is fixed to the inner circumferential surface of the stepped support ring member 73. Teeth 77a made on the inner circumferential surface of the stator-side speed detecting ring head 77 face to the teeth 70a of the upper dish-like rotary ring 70. A head terminal 78 fixed to the second support portion 73b is electrically connected to the stator-side speed detecting ring head 77. Well-known parts for the tape recorder are mounted on the chassis 72. For example, cassette-positioning pins 80 and 81, and a pinch roller arm 82 are mounted on the chassis 72. The pinch roller 51 is rotatably supported by the pinch roller arm 82. The magnetic tape (not shown) is pinched between the pinch roller 51 and the capstan shaft 14.

Since the chassis 72 is made of iron, the parts above the cassis 72 are electro-magnetically shielded from the motor M. According to this modification, the tape recorder can be formed to supper-flat configuration, since the upper and lower casings are omitted.

Figure 25:
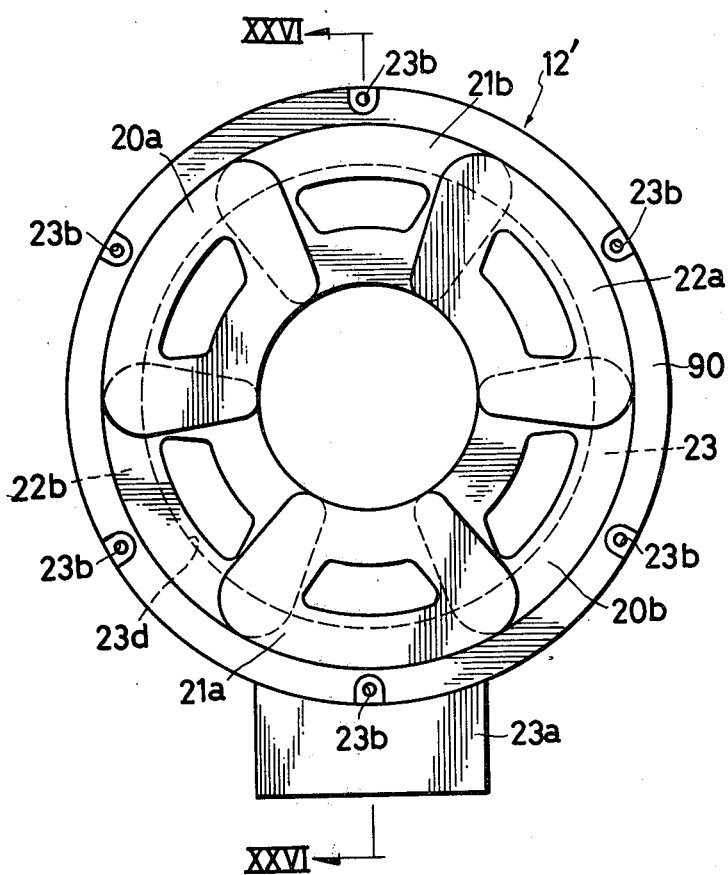
FIG. 25 is a plan view of one modification of the coil assembly of FIG. 12.
Figure 26:
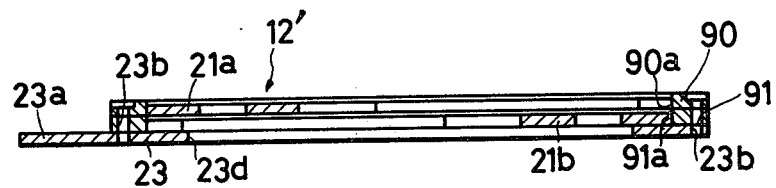
FIG. 26 is a cross-sectional view taken along the line XXVI—XXVI of FIG. 25.

FIG. 25 and FIG. 26 show one modification of the coil assembly 12 of FIG. 12. Parts in this modification which correspond to the parts in FIG. 12 and FIG. 13 are denoted by the same reference numerals, and will not be described hereinafter in detail.

The coil assembly 12' of this modification consists of the six coil units 20a, 20b, 21a, 21b, 22a and 22b, two coil mounting rings 90 and 91 equal to each other, and the printed plate 23. The three coil units 20a, 21a and 22a are fixed at the angularly regular intervals of 120 degrees to the inner circumferential surface of the one coil mounting ring 90 by adhesive. And the other three coil units 20b, 21b and 22b are fixed at the angularly regular intervals of 120 degrees to the inner circumferential surface of the other coil-mounting ring 91 by adhesive. The thickness of the coil-mounting rings 90 and 91 is slightly larger than that of the coil units 20a to 22b. The diameter of the central openings 90a and 91a is smaller than that of the central opening 23d of the printed plate 23.

Figure 27:
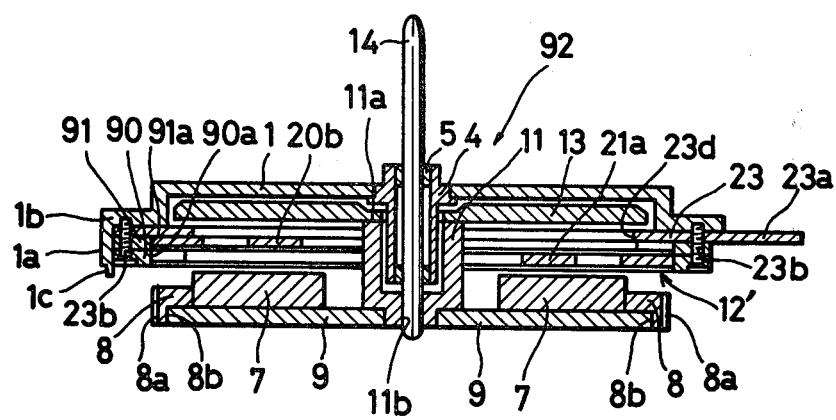
FIG. 27 is a cross-sectional view showing the coil assembly of FIG. 26 attached to the upper casing, which corresponds to FIG. 14.

The coil-mounting rings 90 and 91 are put on each other in such a manner that the six coil units are arranged at the angularly regular intervals of 60 degrees, and the central openings 90a and 91a are aligned with each other. The coil units are fixed to each other at their overlapping portions by adhesive. And the two coil-mounting rings 90 and 91 fixed to each other are fixed to the printed plate 23 so that the central openings 90a and 91a are concentrical with the central opening 23d of the printed plate 23. In this modification, the necessary circuits are printed on the lower surface of the printed plate 23. In the similar manner to the above embodiment, the terminal ends of the coil units are soldered to the circuits on the printed plate 23. The coil assembly 12' thus obtained is fixed to the upper casing 1 by means of the screw holes 23b. As the result, a rotor-stator assembly 92 corresponding to the rotor-stator assembly 29 of FIG. 14 is obtained as shown in FIG. 27.

According to this modification, the number of the coil units can be easily varied in accordance with the requirements of the motor, by piling the coil-mounting rings. That is advantage in parts control.

FIG. 28 to FIG. 32 show another modification of the coil assembly 12 of FIG. 12. Parts in this modification which correspond to the parts in FIG. 12, are denoted by the same reference numerals.

Figure 28:
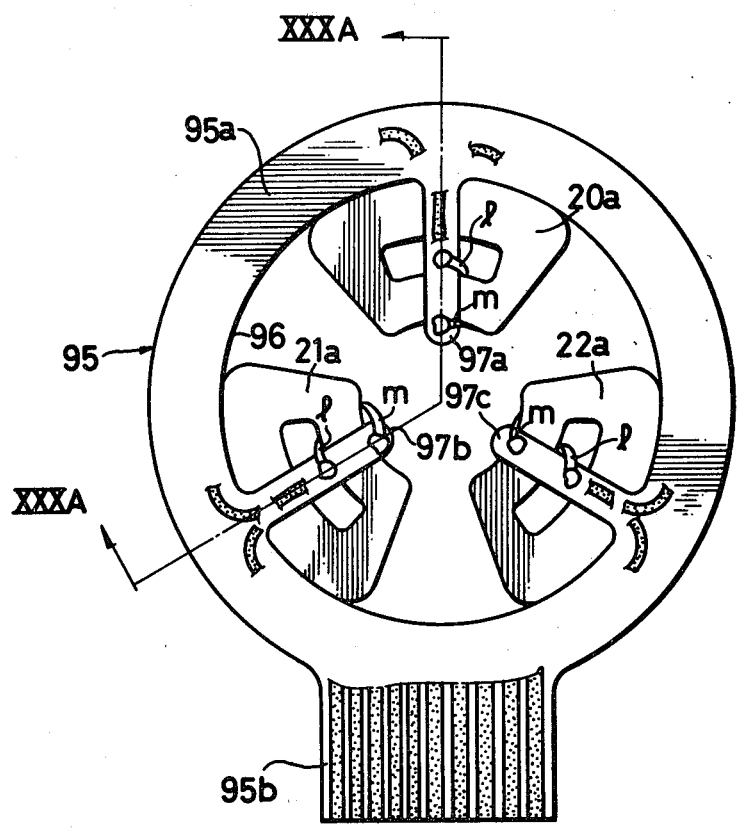
FIG. 28 is a plan view of a part of a further modification of the coil assembly of FIG. 12.

Referring to FIG. 28, a first coil-mounting plate 95 is made of flexible material, for example, 110μ thick such as epoxy resin containing glass fiber. Necessary circuits (partially shown) are printed on the first coil-mounting plate 95. The coil-mounting plate 95 consists of a ring portion 95a, a projecting terminal portion 95b and three lead-connecting portions 97a, 97b and 97c projecting radially inward from the inner circumferential edge 96 of the ring portion 95a at the angularly regular intervals of 120 degrees.

Referring to FIG. 29, a second coil-mounting plate 98 is made of the same material as the first coil-mounting plate 95. Necessary circuits are printed on the back surface of the plate 98. Similarly to the first coil-mounting plate 95, the second coil-mounting plate 98 consists of a ring portion 98a, a projecting terminal portion 98b and three lead-connecting portions 94a, 94b and 94c projected from the inner circumferential edge 99 of the ring portion 98a at the angularly regular intervals of 120 degrees. However, the lead-connecting portions 97a, 97b and 97c are shifted from the lead-connecting portions 94a, 94b and 94c when the projecting terminal portion 95b of the first coil-mounting plate 95 is aligned with the projecting terminal portion 98b of the second coil-mounting plate 98.

Next, the coil units 20a, 21a and 22a are arranged on the back surfaces of the lead-connecting portions 97a, 97b and 97c of the coil-mounting plate 95 so that the central lines of the coil unit 20a, 21a and 22a are aligned with the central lines of the lead-connecting portions 97a, 97b and 97c, and the outer arcuate edges of the coil units 20a, 21a and 22a are aligned with the inner edge 96 of the ring portion 95a of the coil-mounting plate 95. The coil units 20a, 21a and 22a may be fixed to the lead-connecting portions 97a, 97b and 97c by adhesive.

Similarly, the coil units 20b, 21b and 22b are arranged on the front surfaces of the lead-connecting portions 94a, 94b and 94c, and they may be fixed to the latter by adhesive.

Figure 31:
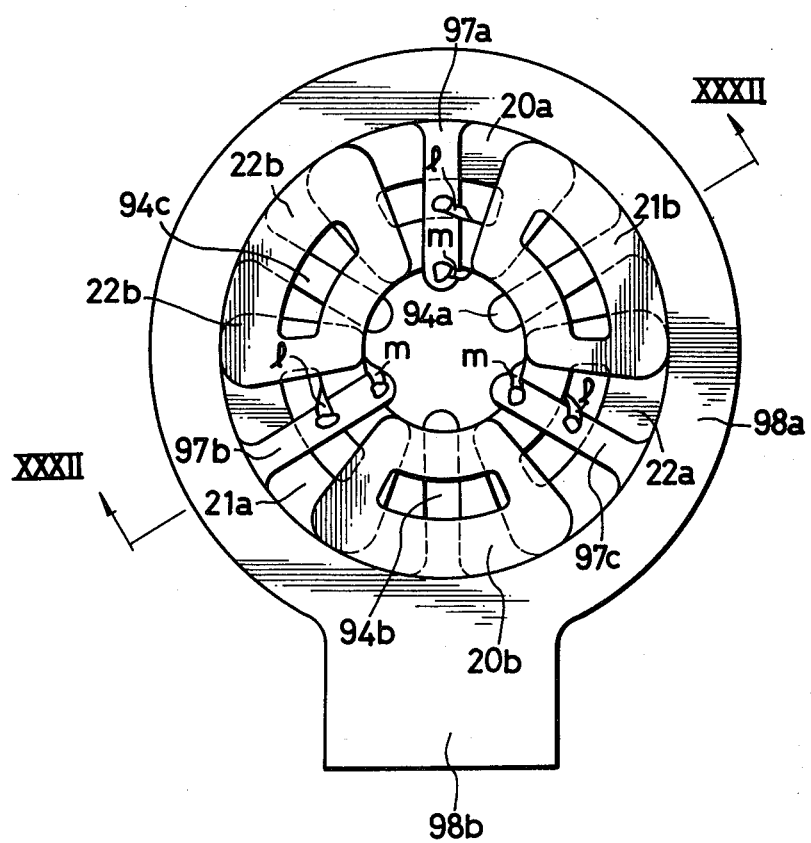
FIG. 31 is a plan view of the modification of the coil assembly.

The initial ends l and terminal ends m of the coil units 20a to 21b are soldered to the printed circuits on the lead-connecting portions 97a, 97b, 97c, 94a, 94b and 94c at the nearest points, respectively, in the manner shown in FIG. 28 and FIG. 31. Insulating films are deposited on the printed circuits of the first and second coil-mounting plates 95 and 98.

Figure 32:
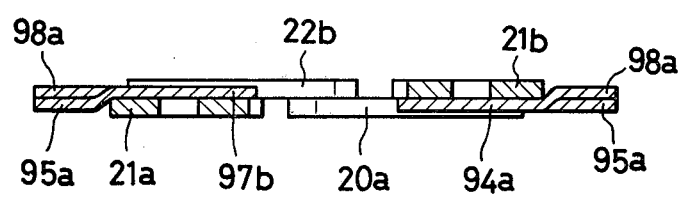
FIG. 32 is a cross-section view taken along the line XXXII—XXXII of FIG. 31.

Next, the second coil-mounting plate 98 with the coil units is superimposed on the first coil-mounting plate 95 with the coil units in the manner shown by the FIG. 30A and FIG. 30B. The projecting terminal portions 95b and 98b are put together on each other. The lead-connecting portions 97a, 97b, 97c, 94a, 94b and 94c are interposed between the adjacent coil units in the superimposed coil-mounting plates 95 and 98 as shown in FIG. 31. The lead-connecting portion 97a, 97b and 97c of the first (lower) coil-mounting plate 95 are bent upwardly at the base ends as shown in FIG. 32, while the lead-connecting portions 94a, 94b and 94c of the second (upper) coil-mounting plate 98 are bent downwardly at the base ends as shown in FIG. 32. A permissible smallest bending radius is 5ψ for epoxy resin containing glass fiber material and being 110μ thick. Accordingly, the lead-connecting portions 94a to 97c can be easily bent in the manner shown in FIG. 32. The coil units are fixed to each other at the overlapping portions by adhesive. The coil-mounting plates 95 and 98 are fixed to each other by adhesive. Alternatively, the whole of the coil assembly thus obtained may be hardened with suitable resin.

Figure 33:
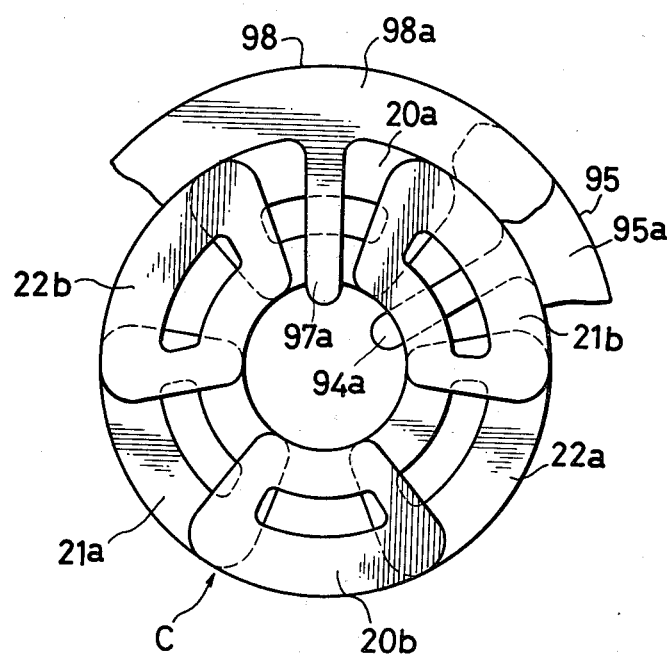
FIG. 33 is a partly broken-away plan view of one modification of the coil assembly of FIG. 31.

FIG. 33 shows a further modification of the coil assembly shown in FIG. 28 to FIG. 32. In this case, the six coil units 20a to 22b are first equally divided into the upper and lower groups, and arranged at the angularly regular intervals of 60 degrees in the manner shown in FIG. 33. They are fixed to each other by adhesive. Then, the first and second coil-mounting plates 95 and 98 are combined with the thus obtained coil-unit assembly C so that the lead-connecting portions 97a, 97b, 97c, 94a, 94b and 94c are interposed between the adjacent coil units. The outer circumferential surface of the coil-unit assembly C is fixed to the inner edge 96 and 99 of the superemposed coil-mounting plates 95 and 98 by adhesive. The initial ends l and terminal ends m of the coil units are soldered to the lead-connecting portions 94a, 94b, 94c, 97a, 97b and 97c at the nearest position, although they are not shown in FIG. 33. In the case of FIG. 33, the lead-connecting portions 94a, 94b, 94c, 97a 97b and 97c are not bent at the base ends.

Figure 34:
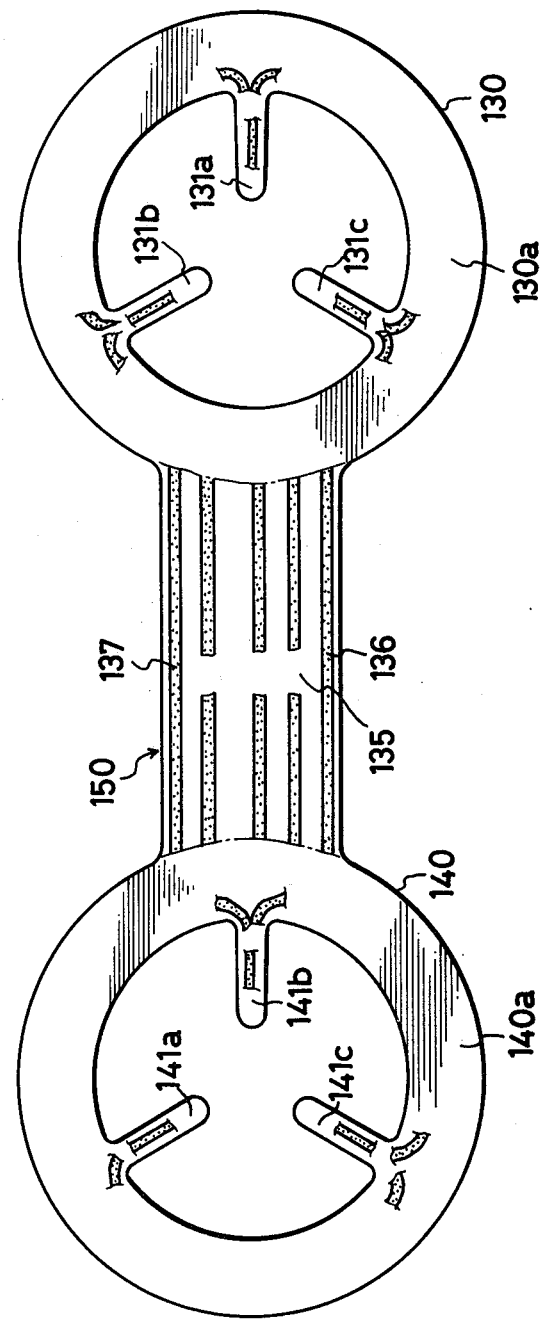
FIG. 34 is a plan view of a part (coil-mounting plate) of a further modification of the coil assembly of FIG. 31.
Figure 35:
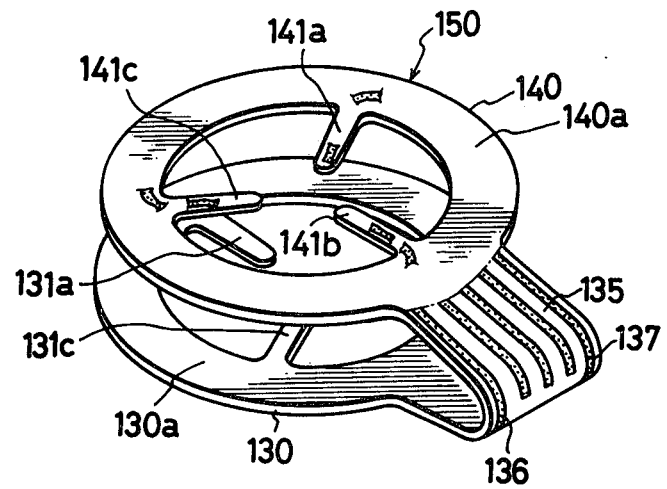
FIG. 35 is a perspective view showing the coil-mounting plate of FIG. 34 being bent.

FIG. 34 and FIG. 35 show a still further modification of the coil assembly shown in FIG. 28 to FIG. 32. In this modification, the first and second coil-mounting plates 95 and 98 are united with each other.

In FIG. 34, a coil-mounting plate 150 comprises first and second coil-mounting parts 130 and 140, and they correspond to the above-described frist and second coil-mounting plates 95 and 98. Similarly, lead-connecting portions 131a, 131b, 131c, 141a, 141b and 141c correspond to the above-described lead-connecting portions 97a, 97b, 97c, 94a, 94b and 94c. The first and second coil-mounting parts 130 and 140 are connected to each other by a common terminal portion 135. Necessary circuits (partially shown) are printed on the surface of the coil-mounting plate 150. Although the circuits of the first coil-mounting plate 95 are not originally connected to the circuits of the second coil-mounting plate 98 in the coil assembly of FIG. 28 to FIG. 32, the circuits to be connected are originally connected in the modification of FIG. 34 and FIG. 35, as shown by circuits 136 and 137. Accordingly, the sequent wiring operation is reduced.

In the coil mounting step, the coil-mounting plate 150 is bent at the central portion of the common terminal portion 135 as shown in FIG. 35. The printed circuits face to the exterior. The coil-unit assembly C shown in FIG. 33 is interposed between the first and second coil-mounting parts 130 and 140. Ring portions 130a and 140a of the first and second coil-mounting parts 130 and 140 are fixed to each other by adhesive. The outer circumferential surface of the coil-unit assembly C is fixed to the inner edges of the coil-mounting plate 150 by adhesive. The initial ends l and terminal ends m of the coil units are soldered in the printed circuits of the lead-connecting portions 131a, 131b, 131c, 141a, 141b, and 141c, at the nearest positions.

In the modfications of the coil assembly of FIG. 28 to FIG. 35, the initial ends l and terminal ends m of the coil units can be easily connected to the circuits, and it can be avoided that the wires of the coil units extend across the coil unit or coil units.

Figure 36:
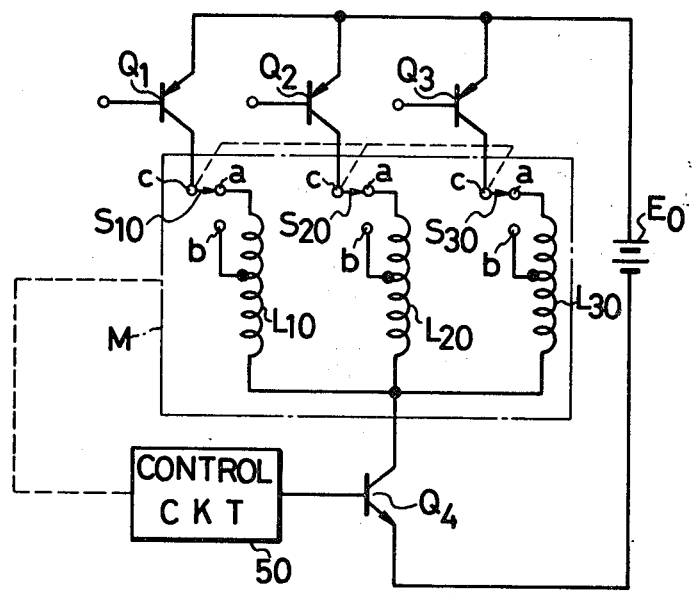
FIG. 36 is a circuit diagram of one modification of the drive circuit of FIG. 17.

FIG. 36 shows one modification of the drive circuit of FIG. 17. Parts in FIG. 36 which correspond to the parts in FIG. 17, are denoted by the same reference numerals, and will not be described in detail. In this modification, three coil units $L_{10}$, $L_{20}$ and $L_{30}$ are arranged to the coil assembly. Center taps are fixed to the coil units $L_{10}$, $L_{20}$ and $L_{30}$ at predetermined positions, and they are connected to second stationary contacts b of change-over switches $S_{10}$, $S_{20}$ and $S_{30}$, respectively. First stationary contacts a of the switches $S_{10}$, $S_{20}$ and $S_{30}$ are connected to terminal ends of the coil units $L_{10}$, $L_{20}$ and $L_{30}$. Movable contacts c of the switches $S_{10}$, $S_{20}$ and $S_{30}$ are connected to the collectors of transistors $Q_1$, $Q_2$ and $Q_3$. The movable contacts c of the switches $S_{10}$, $S_{20}$ and $S_{30}$ are ganged with each other.

When the movable contacts c of the switches $S_{10}$, $S_{20}$ and $S_{30}$ are connected to the stationary contacts a, the impedances of the coil units $L_{10}$, $L_{20}$ and $L_{30}$ to work are higher, and the motor M is rotated at the lower speed. And when the movable contacts c of the switches $S_{10}$, $S_{20}$ and $S_{30}$ are connected to the second stationary contacts b, the impedances of the coil units $L_{10}$, $L_{20}$ and $L_{30}$ to work are reduced, and the motor M is rotated at the higher speed. Also this modification has the same advantage as the above described drive circuit of FIG. 17.

What is claimed is:

1. A brush-less DC motor comprising: magnetic means constituting a stator member; a stationary cylindrical member projecting from said stator member and having bearings on the inner surface of said stationary cylindrical member; a rotary shaft rotatably supported by said bearings in the stationary cylindrical member and extending axially from the opposite ends of the latter; a rotor assembly including a rotary cylindrical member into which said stationary cylindrical member is inserted and being fixed to said shaft at a portion of the latter extending axially from one of said ends of the stationary cylindrical member, at least two axially spaced apart rotary discs of magnetic material fixed to said rotary cylindrical member, and a permanent magnet fixed to at least one of said rotary discs so as to leave an axial space between the latter; a rotational-position detecting member extending into said space; and a coil assembly including a plurality of coil units and also extending into said space; said shaft having a working poriton extending from the other of said ends of the stationary cylindrical member so as to be relatively close to said bearings for stable acceptance by the latter of lateral loads applied to said working portion of the shaft.

2. A brush-less DC motor according to claim 1; in which said stator member is a part of a chassis of an acoustic apparatus.

3. A brush-less DC motor according to claim 1; in which said rotary cylindrical member is made of non-magnetic material.

4. A brush-less DC motor according to claim 3; in which said non-magnetic material is brass.

5. A brush-less DC motor according to claim 1; in which said bearings are of oleo shintered alloy.

6. A brush-less DC motor according to claim 1; in which said coil assembly includes an even number of flat coil units which are equally divided into two groups with the coil units of each groups being arranged in a circle without over-lapping each other, each of said flat coil-units of one of said two groups is overlapped in respect to adjacent ones of said flat coil-units of the other of said two groups, and said flat coil units of one of said two groups are fixed to said flat coil units of the other of said two groups.

7. A brush-less DC motor according to claim 1; in which said coil assembly includes a coil-unit mounting plate having a circular recess by which said coil units are positioned.

8. A brush-less DC motor according to claim 7; in which said coil unit mounting plate comprises two mounting members having circular openings of different diameters, and said mounting members are superposed on each other so that said circular openings are concentric with each other, to form said circular recess.

9. A brush-less DC motor according to claim 1; in which said coil units of the coil assembly are flat, said coil assembly further includes plural coil-unit mounting rings, said flat coil units are fixed at outer arcuate surfaces thereof to inner circumferential surfaces of said plural coil-unit mounting rings, said plural coil-unit mounting rings are superposed on each other, and said flat coil-units mounted on one of said coil-unit mounting rings are fixed to said flat coil-units mounted on another of said coil-unit mounting rings at their overlapping portions.

10. A brush-less DC motor according to claim 1; in which said coil-units are flat and said coil-assembly further includes at least one coil-unit mounting plate having an opening and band-like lead-connecting portions directed inwardly in said opening are having at least initial ends of wires of said coil units connected to said lead-connecting portions.

11. A brush-less DC motor according to claim 10; in which said coil-unit-mounting plate is made of flexible material.

12. A brush-less DC motor according to claim 11; in which said coil-unit mounting plate comprises two coil-unit mounting parts combined with each other, said coil-units being interposed between said two coil-unit mounting parts.

13. A brush-less DC motor according to claim 1; in which said rotational-position detecting member comprises an arcuate plate having rotational-position detecting elements thereon, said arcuate plate being radially positioned by a part of said stator member, and being capable of angular adjustment in the peripheral direction.

14. A brush-less DC motor according to claim 13; in which said arcuate plate includes a protrusion accessable from the exterior of said motor.

15. A brush-less DC motor according to claim 1; further comprising changeable connection forming means by which the connections of said coil units can be changed over to change the output characteristic of said motor.

16. A brush-less DC motor according to claim 1; in which said coil units are divided into plural groups which are energized in order in response to detecting outputs of said rotational-position detecting member; and further comprising connection forming means operative selectively to establish parallel connections and series connections of said coil units in the respective groups for correspondingly changing the impedances of said respective groups in accordance with the required output characteristic of said motor.

17. A brush-less DC motor according to claim 1; in which each of said coil units includes at least one tap and a terminal end; and further comprising means for energizing each of said coil units selectively through said tap and said terminal end so as to change the impedance of each coil unit in accordance with the requred output characteristic of the motor.

* * * * *